United States Patent [19]
Keefer

[11] 4,432,876
[45] Feb. 21, 1984

[54] REVERSE OSMOSIS APPARATUS AND METHOD INCORPORATING EXTERNAL FLUID EXCHANGE

[75] Inventor: Bowie G. Keefer, Vancouver, Canada

[73] Assignee: Seagold Industries Corporation, Burnabay, Canada

[21] Appl. No.: 173,456

[22] Filed: Jul. 30, 1980

[51] Int. Cl.³ .................... B01D 31/00; B01D 13/00
[52] U.S. Cl. ................ 210/652; 210/416.1; 210/433.2
[58] Field of Search .............. 210/416.1, 134, 652, 210/130, 321.1, 433.2; 417/541, 374, 323, 517

[56] References Cited
U.S. PATENT DOCUMENTS 4,187,173  2/1980  Keefer .................... 210/416.1 X
4,288,326  9/1981  Keefer .................... 210/416.1 X Primary Examiner—Frank A. Spear, Jr.
Attorney, Agent, or Firm—Carver & Co.

[57] ABSTRACT

Reverse osmosis pump using a fluid volume exchange structure interconnecting pumping and expansion chambers of feed cylinder externally of feed cylinder. This structure permits exchange of volume between pumping and expansion chambers following initiation of induction or pumping stroke. Volume exchange provides a dwell interval to shift main directional valve across closed center position thereof, thus increasing tolerance to valve actuation, and also tends to equalize pressure differences across ports of the valve prior to opening of such ports, thus reducing erosion and valve gear wear. Also tends to reduce pressure differences across feed displacer, thus reducing sealing problems. Volume exchange structure can be a resilient diaphragm with no intermixing of fluid, mechanically timed valve permitting intermixing of fluid, or crossover relief valves which are pressure responsive to permit intermixing of fluid.

15 Claims, 5 Drawing Figures

REVERSE OSMOSIS APPARATUS AND METHOD INCORPORATING EXTERNAL FLUID EXCHANGE

BACKGROUND OF THE INVENTION

1. Field of the Invention

The invention relates generally to reverse osmosis and ultra filtration fluid separation processes, and is applicable particularly to water desalination and purification by reverse osmosis.

2. Prior Art

In reverse osmosis filtered sea water, eg saline water, is pumped to a working pressure well in excess of osmotic pressure and is fed into a pressure vessel containing semi-permeable membranes. Purified product fluid, i.e. potable water, permeates through the membranes, and concentrated brine remaining behind the membrane at nearly full working pressure is exhausted to prevent excessive salt concentration. The concentrate fluid must first be depressurized by a throttle valve which wastes the pressure energy, or by a mechanical energy recovery device which permits recovery of energy in the concentrate fluid.

Two examples of energy recovery devices in reciprocating pumps are shown in U.S. Pat. No. 3,558,242, inventor W. D. Jenkyn-Thomas, and U.S. Pat. No. 4,124,288, inventor L. P. S. Wilson. In these patents, a sliding spool valve or rotary valve is used to control direction of fluid flow into and out from the expansion chamber of the feed pump, the valves being phased relative to the pump stroke to permit fluid entry and exit precisely at extreme limits of the piston stroke. This, of course, requires accurate valve timing and fast valve shift to reduce chances of hydraulic lock or system pressure loss, because movement of the valve means cannot occur while the piston means is moving. It follows that the valve timing mechanism requires close manufacturing tolerances, and thus excessive wear in the valve mechanism would likely cause severe problems.

The working pressure is commonly of the order of 70 Kg/sq. cm. and thus directional valve gear is subject to relatively high forces, particularly in view of the relatively poor lubricity of sea water. In the two references referred to above, directional valve shifting occurs across ports subjected to high pressure difference which subject the valves to severe erosion problems, and may impose high loading on the valve gear, tending to aggravate wear and compound the risk of pressure loss.

U.S. Pat. No. 4,187,173, issued to the present inventor, discloses internal dwell means which permit approximate equalization of pressure between pumping and expansion chambers of the feed cylinder and approximate equalization of pressure across ports of the main directional valve prior to opening of such ports. Applicant discloses in FIG. 5 of his patent, a crank driven "yieldable piston," in which there is axial movement between portions of the piston and the piston rod so that the piston rod stroke is longer than the piston stroke. Axial movement between the piston and piston rod provides a dwell interval which enables transfer of fluid volume by independent movement of the piston permitting approximate equalization of pressure across the chambers of the feed pump. During dwell the piston rod travels by itself and acts as a plunger producing a relatively slow pressure change. This is because the relatively small rod diameter is moving within the relatively large trapped fluid volume and excessive pressure rise or cavitation is prevented by check valves controlling fluid flow to and from the pumping chamber.

SUMMARY OF THE INVENTION

The present invention resembles to some extent the applicant's previous invention disclosed in his U.S. patent aforesaid and provides an alternative dwell means to attain similar advantages. In contrast to the dwell means associated with the yieldable piston of the patent, which is disposed internally of the feed pump, the present invention provides a dwell means disposed externally of the feed pump and thus permits the use of a simpler rigid piston and permits relatively easy servicing of the dwell means if required. Furthermore, the external dwell means of the present invention can be either for simple exchange of volume between pumping and expansion chambers, or can, similarly to one embodiment of the previous invention, also provide actual fluid intermixing between the pumping and expansion chambers.

A pumping apparatus according to the invention separates a feed fluid into permeate fluid and concentrate fluid fractions which respectively are permeated and rejected by selected membrane means. The pumping apparatus includes a reciprocating feed pump, conduit means, valve means, dwell means and means to reduce fluctuations in pressure and fluid flow across the membranes. The feed pump has a feed cylinder with a feed displacer mounted on a feed displacer rod reciprocable within the feed cylinder, the cylinder and displacer rod having relative diameters which define cylinder interior/displacer rod proportions to determine in part the recovery ratio of permeate fluid fraction to total feed fluid flow. The pump has a pumping chamber on one side of the displacer communicating with inlet conduit means to admit feed fluid and outfeed conduit means to conduct feed fluid to the membranes. Return conduit means conduct concentrate fluid from the membranes to an expansion chamber on an opposite side of the displacer. The valve means includes first and second valve means communicating with the expansion chamber and pumping chambers respectively and co-operating with the conduit means to direct fluid flow to and from the membrane means, and to exhaust depressurized concentrate fluid fraction from the expansion chamber. The first valve means has a closed intermediate position between two open positions. Reciprocable drive means activates the feed displacer rod and the first valve means whilst maintaining a phase difference between the feed displacer stroke and actuation of the first valve means. The dwell means includes a fluid volume exchange means having an exchange conduit means extending externally of the feed cylinder interior and interconnecting the pumping and expansion chambers, and a volume exchange control means within the exchange conduit means to control volume exchange. The dwell means permits exchange of fluid volume and approximate equalization of pressure in the pumping and expansion chambers following reversal of feed displacer rod movement, and also provides a dwell interval sufficient to shift the first valve means across an essentially closed intermediate position thereof while initial movement of the feed displacer rod tends to equalize pressure differences across ports of the first valve means that are about to be opened prior to opening of such ports.

A method according to the invention utilizes an apparatus as above described and includes steps of simultaneously inducting feed fluid into the pumping chamber and exhausting depressurized concentrate fluid from the expansion chamber. This is followed by pressurizing feed fluid in the pumping chamber and simultaneously admitting pressurized concentrate fluid into the expansion chamber to supplement energy supplied to the feed displacer. The method is characterized by, following the reversal of the feed displacer rod movement, exchanging fluid volume between the pumping and expansion chambers externally of the feed cylinder interior so as to approximately equalize pressure differences across ports of a directional valve means that are about to be opened prior to opening of such ports, and essentially simultaneously shifting the first valve means across the essentially closed intermediate position thereof.

A multi-cylinder embodiment with feed cylinders phased apart can also use the external fluid exchange means.

A detailed disclosure following, related to drawings, described preferred embodiments of the invention which is capable of expression in apparatus and method other than those particularly described and illustrated.

DETAILED DISCLOSURE

FIG. 1 (Prior Art)

Figure 5:
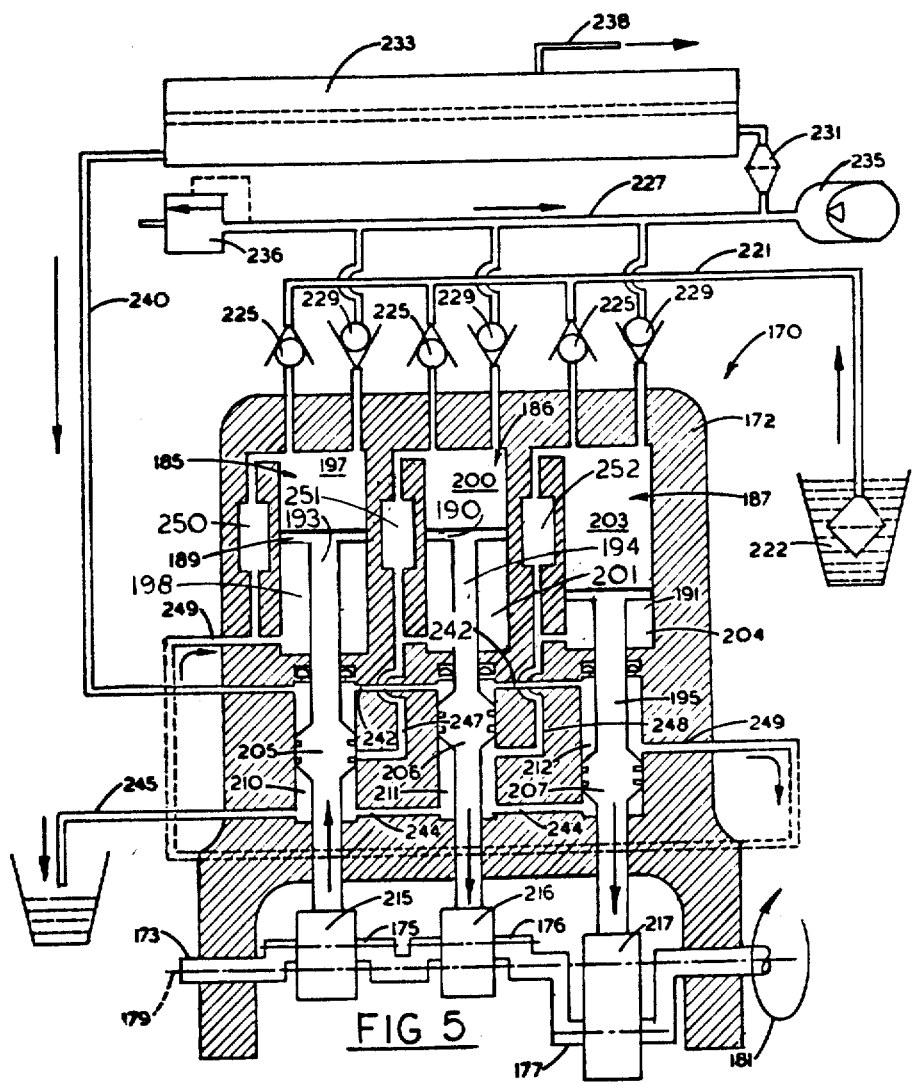
FIG. 5 is a schematic of a three cylinder embodiment with generalized external dwell means.

A pumping apparatus 10 of the prior art will be described briefly, but for a greater understanding the present inventor's U.S. Pat. No. 4,187,173 should be reviewed, particularly with reference to FIGS. 5 and 6.

The pumping apparatus 10 separates a feed fluid 11 into a permeate fluid fraction 13 and a concentrate fluid fraction 14 which respectively are permeated and rejected by selective membrane means 16 in a membrane pressure vessel 17. Apparatus includes a reciprocating feed pump 19 having a feed cylinder 20 with a feed displacer 22 mounted on a feed displacer rod 23 reciprocable within the feed cylinder 20. The cylinder and feed displacer rod have relative diameters which define cylinder interior/displacer rod proportions to determine in part the recovery ratio of permeate fluid fraction to total feed fluid flow. When referring to single stage treatment, for brackish water of low salinity, a high recovery ratio of 70 percent to 90 percent is usual, but for sea water a low ratio of 10 percent to 30 percent is usual.

The feed displacer divides the feed cylinder into a pumping chamber 26 on one side of the displacer which communicates with inlet conduit means 28 to admit feed fluid, and with outfeed conduit means 30 to conduct feed fluid to the membranes 16. Check valves 32 and 33 in the inlet conduit 28 and outfeed conduit means 30 respectively control fluid flow from a source to the pumping chamber, and from the chamber to the membranes. A filter 35 and surge absorber or accumulator 36 in the conduit means 28 and 30 respectively filters the feed fluid, and absorbs pressure surges in the conduit means 30. A return conduit means 38 conducts concentrate fluid from the membranes to an expansion chamber 37 on the opposite side of the displacer, and a surge absorber 40 in the conduit 28 similarly absorbs flow fluctuations therein. The surge absorbers 36 and 40 can be combined in an one component differential surge absorber as disclosed in applicant's patent, or other equivalents can be substituted, all of which tend to reduce fluctuations in pressure and fluid flow across the membranes to reduce the effects of concentration polarization that might otherwise occur. A return directional valve 42 in the conduit 38 and a main exhaust directional valve 44 in an exhaust conduit 45 both communicate with expansion chamber 37 and are preferably combined in a single valve serving as a main directional valve to control fluid flow to and from the expansion chamber, and in applicant's patent are combined in a 3 way spool valve and are termed a first valve means 47. A coupling 46, broken line, shows direct coupling of the valves 42 and 44 which are never open at the same time. The first valve means 47 thus direct pressurized concentrate fluid from the membranes to the expansion chamber and then exhausts depressurized concentrate fluid fraction from the expansion chamber. The first valve means has a closed intermediate position and is timed from a reciprocable drive means 48 which also actuates the displacer rod 23. The drive means 48 is connected with the displacer rod and the first valve means to maintain a phase difference or angle between feed displacer stroke and actuation of the first valve means. For simplicity, the check valve 32 and 33 in the inlet and outfeed conduits are termed second valve means 50 and control fluid flow from the fluid source and to the membrane means.

The above patent discloses a feed displacer or feed piston 22 which is free to float axially between stops 51 and 52 on the displacer rod and, in one embodiment, permits fluid flow between the pumping and expansion chambers upon reversal of displacer rod stroke. In effect the displacer is a yieldable means associated with the displacer rod to permit relative movement between the displacer and displacer rod upon reversal of the stroke.

The above structure is not shown in any prior art known to the inventor, and the dwell means has several advantages. Firstly, it increases tolerance to main directional valve actuation, that is the first valve means controlling flow relative to the expansion chamber, which is essential, in practical terms, to avoid pressure loss or hydraulic lock that might otherwise occur with inaccurate valve timing. Secondly, pressure difference across ports of the first valve means that are about to be opened is approximately equalized prior to opening of such ports. This is because the yieldable feed displacer causes the displacer rod to serve as a plunger as the displacer rod moves into, or is withdrawn from, the relatively large trapped fluid volume inside the pumping chamber. Movement of the displacer rod whilst the displacer itself is stationary causes the second valve means, which are pressure responsive check valves 32 and 33, to open to an instantaneous adverse pressure difference in the inlet or outfeed conduits, thus tending to equalize pressures across respective ports of the first valve means immediately prior to opening the ports of the first valve means associated with particular conduits. Thus inrush shock of fluid upon valve opening is reduced, thus reducing erosion problems, and load on the valve gear is also reduced, increasing life of the valve gear. Thirdly, pressure difference across the displacer is appoximately equalized, reducing sealing problems.

It must be understood that the directional valves 42.2 and 44.2 are timed to open after initiation of a pumping or exhaust stroke respectively so that the valve actuation lags the displacer stroke, which is termed lagging dwell. As is described in the inventor's patent, the dwell can be many degrees of rotation of the drive means so that, if a rotating crank shaft is used, the dwell can be 10 degrees to 30 degrees.

The relative movement of the yieldable means permits approximate equalization of pressures between the pumping and expansion chambers following reversal of feed displacer rod movement and the initial movement of the feed displacer rod tends to equalize pressure differences across ports of the first valve means that are about to be opened prior to opening of the first port, as will be described. These actions occur before valve ports of the first-valve means open and thus provides a valve lag or dwell interval sufficient to shift the first valve means across the essentially closed intermediate position thereof.

FIG. 2

Figure 1:
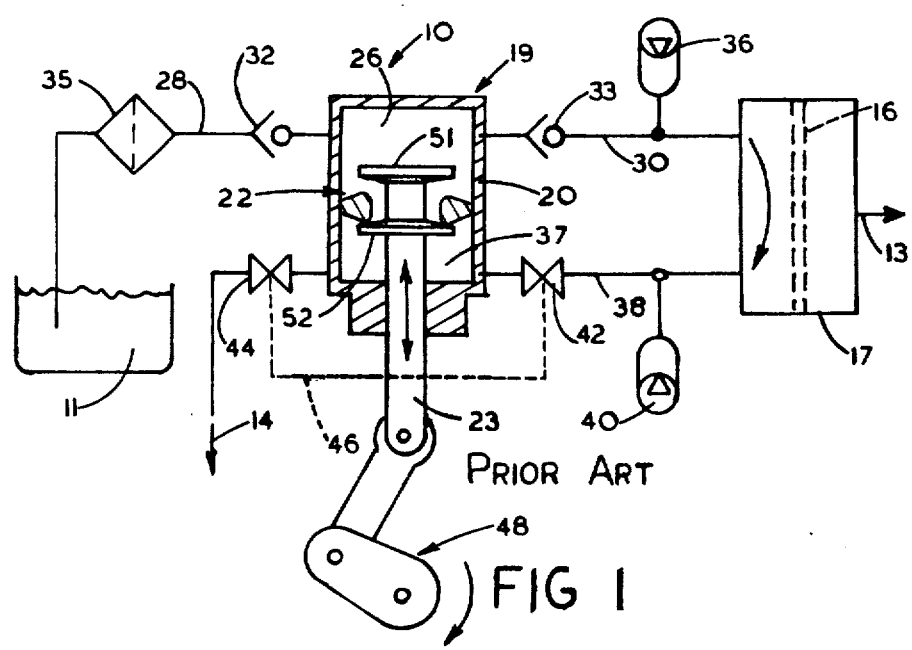
FIG. 1 is a simplified schematic of the prior art single cylinder reverse osmosis apparatus using a feed pump with internal dwell means characterized by a flating displacer.

Much of the structure of new apparatus 60 is similar to that of FIG. 1 and thus similar elements are designated with the same integer as that used in FIG. 1, followed by the designation ".2." Structure associated with the feed cylinder and outfeed and return conduits differs from that in FIG. 1 and thus is described in greater detail. The feed pump 19.2 has a feed displacer 61 which is a rigid piston that is secured to a feed displacer rod 63, and pumping and expansion chambers 26.2 and 37.2 are provided on opposite sides of the displacer. The invention includes a fluid volume exchange means 64 having undesignated short conduits and an exchange chamber 65 extending between the outfeed conduit 30.2 and return conduit 38.2, and an exchange displacer 66 held adjacent the center of the exchange number between two coil springs 68 and 69. The exchange displacer 66 divides the exchange chamber into first and second chambers 71 and 72 and is sealed against leakage between the chambers. Thus the first chamber 71 is in direct communication with the pumping chamber 26.2, and the second chamber 72 is in direct communication with the expansion chamber 37.2. The exchange chamber thus communicates with the outfeed conduit between the check valve 33.2 and the feed pump, and with the return conduit 38.2 between the directional valve means and the pump.

OPERATION

In operation, reciprocation of the feed displacer rod 63 in accordance with an arrow 62 generates pulses of feed fluid in the outfeed conduit 30.2 which, after some actuation of the surge absorbers 36.2 and 40.2, return via the return conduit 38.2 to the expansion chamber. Upon initiation of a pumping stroke there is a sudden pressure rise in the pumping chamber as the directional valve has not yet opened. This pressure rise is reduced by fluid volume displaced into the exchange chamber 71 and a simultaneous corresponding downwards displacement of the exchange displacer as drawn in FIG. 2. This simultaneously displaces additional fluid into the expansion chamber 37.2 to add fluid volume thereto, thus reducing possible cavitation that otherwise might have resulted from the sudden initiation of the pumping stroke. When the first valve means opens, that is when the return directional valve 42.2 opens during the pumping stroke, there is a decrease in pressure in the outfeed conduit means 30.2 and the exchange displacer is free to move back to the centered balanced position until the end of the pumping stroke. Similarly, initiation of an induction stroke also occurs when the first valve means is closed, and this causes a sudden pressure rise in the expansion chamber 37.2. This sudden pressure rise results in upwards displacement of the exchange displacer 66 towards the outfeed conduit 30.2, which correspondingly increases pressure in the pumping chamber until the exhaust valve 44.2 is opened. When the valve 44.2 is opened the feed displacer can displace feed fluid to exhaust and the exchange displacer can return to the centred balanced position.

It can be seen that the exchange displacer is responsive to relatively small volumes of fluid displaced during initiation of pumping and induction strokes prior to opening of the first valve means. There is thus an exchange of volume between the pumping and expansion chambers of the feed cylinder following reversal of the displacer rod stroke. While the valves 42.2 and 44.2 remain closed during initiation of either a pumping or an induction stroke, the difference in displaced fluid volume between the pumping and expansion chambers 26.2 and 37.2 due to movement of the rod 73 is accommodated either by the surge absorbers 36.2 and 40.2, or by limited flow of fluid through the check valve 32.2 respectively. When either of the valves 42.2 or 44.2 is opened during the remainder of a pumping or induction stroke, the difference in displaced fluid between the pumping and expansion chambers is accommodated mostly by passage of permeate fluid through the membranes, and only relatively slightly by movement of the displacer 66 of the fluid volume exchange means or the surge absorbers. After initiation of a stroke when either of the valves 42.2 or 44.2 is open, the displacer 66 of the fluid volume exchange means remains approximately centred, but it may oscillate slightly in response to pressure fluctations. Thus the exchange chamber, including associated short conduit portions, and the exchange displacer are seen to serve as a combination of exchange conduit means and volume exchange control means respectively. The exchange conduit means extends externally of the feed cylinder interior between the pumping and expansion chambers, and the volume exchange control means is within the exchange conduit to control volume exchange. This permits an exchange of fluid volume and approximate equalization of pressure between the pumping and expansion chambers following reversal of the feed displacer rod movement, thus providing a dwell interval sufficient to shift the first valve means across an essentially closed intermediate position thereof. Similarly to the previously described prior art embodiment, initial movement of the feed displacer rod, which of course also includes the displacer as there is a rigid connection therebetween, also tends to equalize pressure differences across ports of the first valve means that are about to be opened prior to the opening of such ports. This applies for both the pumping stroke and the induction stroke. It can be seen that the exchange conduit means extends between the outfeed conduit and return conduit and the volume exchange control means is a yieldable partition means extending across the exchange conduit to prevent intermixing of fluids between the pumping and expansion chambers and yet yielding to pressure differences resulting from initiation of displacer stroke. Thus the method according to the invention differs from the previously described method by externally exchanging fluid volume between the pumping and expansion chambers following reversal of feed displacer rod movement.

ALTERNATIVES AND EQUIVALENTS

Figure 2:
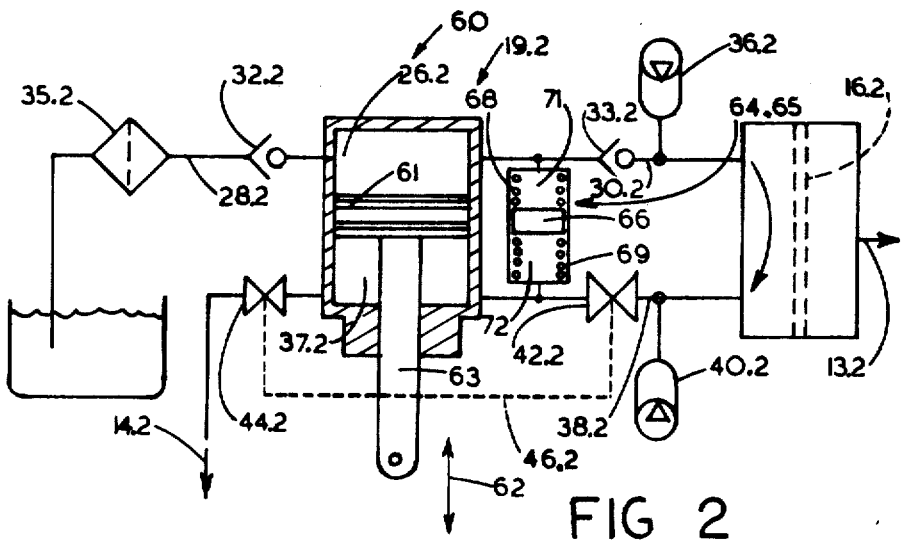
FIG. 2 is a first embodiment of the invention using a yieldable partition type of external dwell means.

A variation of the exchange means 64 of FIG. 2 would be to permit a small actual intermixing of fluid, but this is not the main purpose of the FIG. 2 embodiment.

FIG. 3

Similarly to FIG. 2, a first alternative pumping apparatus 80 has many elements that are similar to those of FIG. 1 and thus are similarly designated with the same numerical reference or integer plus ".3."

The embodiment of pumping apparatus 80 has a feed displacer 81 on feed displacer rod 82 which is generally similar to that of FIG. 2. The volume exchange means 64 of FIG. 2 has been eliminated and a dwell vent valve means 84 substituted, the valve being fitted in an exchange conduit means 85 extending between the outfeed and return conduits 30.3 and 38.3 respectively. The valve is a directly mechanically actuated valve that permits actual interchange or intermixing of fluids between the pumping and expansion chambers and is timed by a timing mechanism (not shown) so as to be open whenever both the return and exhaust valves 42.3 and 44.3 respectively are closed, and to be closed when either the valve 42.3 or 44.3 is open. The actuation and timing mechanism of the valve 84 can be a rod or cam follower driven from the reciprocating drive means, not shown, of the feed displacer rod 82. As in the previous embodiment, the valves 42.3 and 44.3 are never open simultaneously. It can seen that the dwell vent valve in this instance is not pressure responsive but requires mechanical connections with the drive mechanism to ensure accurate timing. It can be seen that the dwell vent valve means serves as the volume exchange control means and is adapted to open to permit fluid flow therethrough to intermix fluid between the pumping and expansion chambers following initiation of displacer rod strokes.

Figure 3:
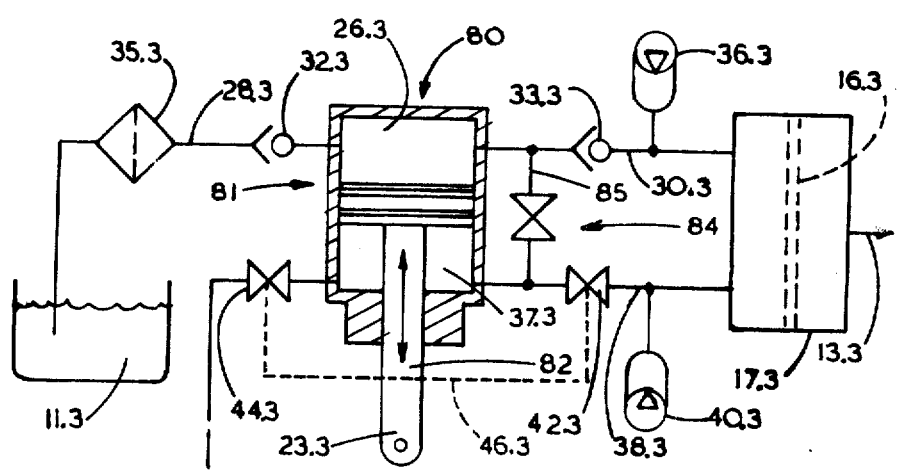
FIG. 3 is a second embodiment of the invention using a dwell vent valve type of external dwell means.

The major differences between the embodiments of FIGS. 2 and 3 is that, in the main embodiment of FIG. 2 there is no intermixing of fluids between the pumping and expansion chambers, but merely an exchange of volume to accommodate sudden pressure rises following initiation of displacer rod stroke, whereas in FIG. 3 there is an actual intermixing of fluid to accommodate these pressure rises. Also the FIG. 2 embodiment is pressure responsive and does not require the valve actuation and timing mechanism of FIG. 3.

FIG. 4

An alternative dwell vent valve means 90 is shown extending between the outfeed conduit 30.3 and return conduit 38.3 and can be directly substituted for the dwell vent valve 84 of FIG. 3. The alternative valve means 90 has cross-over relief valves 93 and 94 fitted in the exchange conduit means 85, which is bifurcated and has bifurcated portions 96 and 97 containing the valves 93 and 94 respectively. The valves are set to open at a relatively low pressure differential so as to pass fluid selectively between the pumping and expansion chambers, not shown, in response to pressure differences between the chambers. It can be seen that this is thus a pressure responsive valve and does not require accurate timing as compared with the FIG. 3 embodiment. It also differs from the FIG. 2 embodiment in that there is actual exchange or intermixing of fluid between the two chambers following initiation of displacer rod stroke. Thus the dwell vent valve means 90 is fitted in the exchange exchange conduit means to balance approximately pressure differences between the pumping and expansion chambers of the feed cylinder, and functions equivalently to the previously described embodiments.

While the external fluid volume is described and illustrated for use in a single cylinder feed pump, clearly this apparatus and method could be adapted for use in a multi-cylinder, crank shaft driven embodiment, in particular for use in a three cylinder pump as described in applicant's co-pending application.

In all embodiments, the actual location of the exchange conduit means is unimportant provided it interconnects the pumping and expansion chambers. For convenience, it is shown interconnecting conduits and thus it actually connects with the outfeed and return conduits on the sides of the respective valves remote from the membrane means. Thus one portion of the exchange conduit means communicates with the outfeed conduit means 30.2 or 30.3 between the pumping chamber 26.2 or 26.3 and one of the second valve means 33.2 or 33.3, and the remaining portion of the exchange conduit means communicates with the return conduit meand 38.2 or 38.3 between the expansion chamber 37.2 or 37.3 and one of the first valve means 42.2 or 42.3.

FIG. 5

A multiple cylinder embodiment will now be described in some detail. For convenience a three cylinder embodiment is shown, although more cylinders can be used if used in a cooperating set as will be described. A triplex feed pump assembly 170 has a crankcase 172 and a crankshaft 173 having three throws or cranks pins 175, 176 and 177, the shaft being journalled for rotation about an axis 179. In the description following, the crankshaft rotates in the direction of an arrow 181 and the three throws are spaced equally 120 degrees apart as in a conventional three-throw crankshaft. The pump assembly 170 includes first, second and third feed cylinders 185, 186 and 187, corresponding to the throws 175, 176 and 177, each cylinder having first, second and third feed piston means or feed displacers 189, 190 and 191, having respective piston rod means or feed displacer rods 193, 194 and 195.

Dwell angle D is defined with reference to FIG. 6 in the applicant's patent aforesaid as the interval of zero fluid transfer in the expansion chamber following reversal of reciprocating action applied by the drive means. In this invention an equivalent definition would be the interval of fluid volume transfer in the volume exchange means following reversal of reciprocating action applied to the displacer rod. The dwell angle is thus expressed in degrees of crankshaft rotation occurring during actuation of the dwell means. Also, as explained in the said patent, the phase difference between actuation of the first valve means and initiation of piston rod stroke is (90±(D/2)) degrees. Referring again to FIG. 5 herein, for three cylinders equally spaced, $$\text{cylinder spacing} = \frac{360}{3} = 120°$$

$$\text{nominal dwell angle} = (120° - 90°) \times 2 = \underline{\underline{60°}}.$$

For 'n' cylinders:

$$\text{nominal dwell } D = 2\left(\frac{360}{n} - 90\right)°.$$

The nominal dwell is fixed by the phasing between the crank throws, e.g. number of cylinders. The actual dwell selected may be slightly greater and is dependent on valve design, tolerances, etc. By simple geometry, a 60 degree dwell interval represents one-quarter of piston rod stroke.

Each piston means divides the respective cylinder into a pumping chamber and an expansion chamber, so that the first cylinder 185 has first pumping and expansion chambers 197 and 198, the second cylinder 186 has second pumping and expansion chambers 200 and 201, and the third cylinder has third pumping and expansion chambers 203 and 204 respectively. The piston rod means of each cylinder extends through the expansion chamber to cooperate with the respective throw, that is the rotational drive means, in such a manner as will be described so that three piston means are phased 120 degrees apart.

In this embodiment, the return and exhaust directional valves are combined into a closed center three-way spool valve, as shown in the patent aforesaid, to serve as the first valve means. This has particular advantage in a multi-cylinder arrangement as will be seen. The first, second and third cylinders 185 through 187 have respective first, second and third valve spools 205, 206 and 207 and first, second and third valve chambers 210, 211 and 212 respectively, each spool being reciprocable within the respective valve chamber. The valve spools have inner ends directly connected to the respective piston rod means and outer ends cooperating with respective connecting means 215, 216 and 217 which themselves cooperate with the respective crank throws. The spools are aligned with and rigidly connected to, but can be integral with, the respective piston rods and reciprocate concurrently with the respective piston means. The connecting means are shown diagrammatically and can be links hinged to the outer ends of the rod or spools, (FIG. 1), so as to interconnect the throw and spool, or other equivalent connecting means to accommodate the lateral movement of the throw can be incorporated, or clearly cam means or equivalent rotary drive means can be substituted.

Conduit means and associated equipment cooperating with the feed pump are generally similar to those as previously described and are discussed briefly as follows. Inlet conduit means 221 extend from a feed fluid supply 222 through undesignated connecting conduits having similar inlet check valves 225 to communicate with the pumping chambers 197, 200 and 203 of the feed cylinders. Outfeed conduit means 227 connect the pumping chambers through outfeed check valves 229 and a filter 231 to a membrane pressure vessel 233. A hydraulic accumulator 235 to reduce pressure and flow fluctuations across the membranes, and a pressure relief valve 236 to control maximum system pressure, are incorporated in the outfeed conduit means 227. A permeate conduit 238 discharges permeate fluid from the membranes, and a concentrate return conduit means 240 extends between the membranes and the feed pump assembly 170 to return concentrate fluid to the feed pump.

It can be seen that the inlet conduit means 221 communicate the feed fluid supply with the respective pumping chambers to admit feed fluid into the pumping chambers, and the outfeed conduit means 227 communicate each pumping chamber with the membrane means so as to conduct pressurized feed fluid from the pumping chambers to the membrane means. The check valves 225 and 229 serve as the second valve means communicating with the inlet and outfeed circuit means to control direction of feed fluid fed into and out from the pumping chambers. As previously described, the valve spools within the respective valve chambers serve as first valve means to direct concentrate fluid as required.

Inner ends of the valve chambers 210, 211 and 212 are interconnected by concentrate fluid return conduit portions 242 which communicate with the return conduit means 240. Outer ends of the valve chambers are interconnected by exhaust conduit portions 244 which communicate with a final exhaust conduit 245. Intermediate concentrate fluid conduit means 247 and 248 extend between an intermediate portion of the first and second valve chambers 210 and 211 to connect with the second and third expansion chambers 201 and 204 respectively. An intermediate concentrate fluid conduit means 249 extends from an intermediate position of the third valve chamber 212 to connect with the expansion chamber 198 of the first cylinder, it being noted that this conduit means is shown broken and routed diagrammatically and is equivalent to the interconnections between the previously described valve chambers and expansion chambers. Thus, it can be seen that each valve chamber has at one end thereof an intermediate concentrate fluid conduit means interconnected to the concentrate fluid return conduit means 240, and an opposite end thereof interconnected exhaust fluid conduit means. Adjacent an intermediate position between ends of the valve chamber, intermediate concentrate fluid conduit means interconnect the valve chamber of one cylinder with the expansion chamber of one of the remaining cylinders. Thus, in effect, the return conduit means 240 communicates the membrane means with the expansion chambers of each cylinder so as to conduct the concentrate fluid fraction from the membrane means to the expansion chambers of the feed cylinder. It can be seen that, in view of the phase difference between the cylinders, there is a phase difference between each valve and its respective cylinder of 120 degrees in the same direction of rotation.

Each valve spool has a valve land with spaced seals and is subjected to reciprocation in the cylinder to close off the intermediate conduit portions while permitting fluid connections between the adjacent concentrate return conduit portions and exhaust conduit portions. At a particular instant, as shown in FIG. 7, the first valve spool 205 of the first valve chamber 210 is in an intermediate position, and the intermediate concentrate fluid conduit 247 is closed; the second valve spool 206 is positioned to maintain the conduit means 248 open to exhaust depressurized concentrate fluid from the expansion chamber 204 of the third cylinder, and the third spool 207 is positioned to maintain the conduit means 249 open to direct pressurized concentrate fluid from the membrane means into the expansion chamber 198 of the first cylinder 185. The valve spools and piston rod means are shifting in the directions shown by undesignated arrows. Upon inspection of FIG. 5, it can be seen that the first cylinder 185 is experiencing a pumping stroke, the second cylinder 186 is experiencing a dwell interval, and the third cylinder 187 is experiencing an induction stroke.

Figure 4:
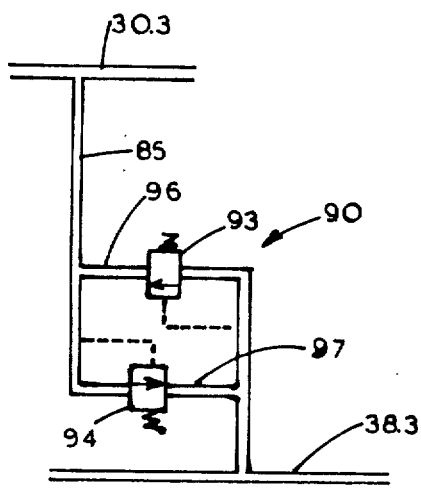
FIG. 4 is a fragmented schematic of a third embodiment of external dwell means using cross-over relief valves.

Similar volume exchange means 250, 251 and 252 interconnect pumping and expansion chambers of the feed cylinders 185, 186 and 187 respectively. For convenience, one end of each volume exchange means 250, 251 and 252 is shown interconnecting the respective intermediate concentrate fluid conduit means 249, 247 and 248 respectively, and an opposite end is shown directly communicating with the pumping chambers 197, 200 and 203 respectively. The volume exchange means is shown diagrammatically and can be any of the specific means as described in FIGS. 2 through 4 herein. Clearly, if the means includes the timed dwell vent valve as shown in FIG. 3, additional timing gear would be required. If pressure responsive means are used, as in FIGS. 2 and 4, timing gear of the volume exchange means can be eliminated.

The operation of the triplex feed pump 170 can be seen to be a combination of three single feed cylinder pumps with energy recovery derived from the returning concentrate fluid means. The feed pumps are phased equally apart in a complete revolution and it can be seen that the first valve means of each cylinder is a slidable valve spool connected rigidly to the respective piston rod means, so that the valve spool connected to one piston rod means controls the direction of pressurized concentrate fluid flow from the membrane means to the expansion chamber of one of the remaining two feed cylinders. Feed fluid flow over the membrane means is characterized by three distinct pressure pulses of fluid during each revolution of the crankshaft, which, at suitable crankshaft RPM, essentially eliminates stagnant flow conditions and also permits reduction in the size of the accumulator 235, or in the differential surge absorber used in the single-cylinder arrangement. There would also be a reduction in torque demand fluctuations on the crankshaft when compared with the single-cylinder embodiment of FIG. 1.

The triplex pump is shown with three feed cylinders cooperating with a crankshaft having three throws. In further alternatives, additional cylinders can be incorporated into the same crankcase, for example a quintuplex feed pump, and driven by a crankshaft having an appropriate number of throws. If desired, the number of feed cylinders used can be expanded in a manner similar to the multi-cylinder internal combustion engine, so as to be generally similar to radial engines having one or more banks of cylinders. The arrangement of inlet, outfeed and return conduit means is generally similar to that as described, and the first valve means, i.e. the spool valves or equivalent, will cooperate with the rotatable drive means so that the respective first valve means of each cylinder is phased relative to the drive means to provide a desired dwell interval between valve actuation and piston means movement. This can be attained without complex timing mechanism in a manner equivalent to that as previously described so that the valve means associated with the one cylinder directs concentrate fluid to and from another cylinder, not necessarily an adjacent cylinder but a cylinder phased so as to be at a desired dwell. In the multi-cylinder embodiments envisaged with two or more banks of radially disposed cylinders, there could be an interconnection between the valves on one bank with the cylinders on an adjacent bank. Clearly, many combinations are possible and in particular, for valve phasing as above described, the total number of cylinders in a cooperating set would be factored by an integral odd number greater than one. Particularly desirable numbers of cylinders are 3 and 5 cylinder embodiments as exemplified, and these can be combined in two banks of totals of 6 and 10 cylinders respectively. Because of the need for substantial dwell, the above definition excludes feed pumps having total numbers of the cylinders such as 2, 4, 8, 16, etc. which would result in a phase difference of 90 degrees or 180 degrees which would be unsuitable for providing dwell when using spool valves integral with piston rod means. In a five cylinder pump the crank throws are separated by 72° and it is preferred to have the valve throw lead the corresponding pump throw by 72°, corresponding to a dwell angle of 36°. This reduced dwell is quite adequate for closed center valve travel, and smoother discharge flow is provided.

I claim:

1. Pumping apparatus for membrane separation apparatus for separating a feed fluid into permeate fluid and concentrate fluid fractions which respectively are permeated and rejected by selective membrane means, the pumping apparatus including: a reciprocating feed pump having at least one feed cylinder with a feed displacer mounted on a feed displacer rod reciprocable within the feed cylinder, the cylinder and displacer rod having relative diameters which define cylinder interior/displacer rod proportions to determine in part the recovery ratio of permeate fluid fraction to total feed fluid flow; a pumping chamber on one side of the displacer communicating with inlet conduit means to admit feed fluid, and with outfeed conduit means to conduct feed fluid to the membranes; return conduit means to conduct concentrate fluid from the membranes to an expansion chamber on an opposite side of the displacer; means to reduce fluctuations in pressure and fluid flow across the membranes, first and second valve means communicating with the expansion chamber and pumping chamber respectively and cooperating with the conduit means to direct fluid flow to and from the membrane means and to exhaust de-pressurized concentrate fluid fraction from the expansion chamber, the first valve means having a closed intermediate position between two open positions; reciprocable drive means activating the feed displacer rod and first valve means whilst maintaining a phase difference or angle between the feed displacer stroke and actuation of the first valve means, the pumping apparatus including dwell means having fluid volume exchange means further characterized by:
   (a) an exchange conduit means extending externally of the feed cylinder interior and interconnecting the pumping and expansion chambers,
   (b) volume exchange control means within the exchange conduit to control volume exchange between the chambers, so that fluid volume is exchanged between the chambers to approximately equalize pressure between the pumping and expansion chambers following reversal of feed displacer rod movement and to provide a dwell interval or angle sufficient to shift the first valve means across an effectively closed intermediate position thereof while initial movement of the feed displacer rod tends to equalize pressure differences across ports of the first valve means that are about to be opened prior to opening of such ports.

2. Apparatus as claimed in claim 1 further characterized by:
  (a) the volume exchange control means being a yieldable partition means extending across the exchange conduit to prevent intermixing of fluid between the pumping and expansion chambers, and yet yielding to pressure differences resulting from initiation of displacer rod stroke.

3. Apparatus as claimed in claim 2 further characterized by:
  (a) the yieldable partition means being an exchange displacer means within an exchange chamber, the displacer being resiliently centered within the displacer chamber.

4. Apparatus as claimed in claim 1 further characterized by:
  (a) the volume exchange control means being dwell vent valve means adapted to open to permit fluid flow therethrough to intermix fluid between the pumping and expansion chambers following reversal of displacer rod stroke.

5. Apparatus as claimed in claim 4 further characterized by:
  (a) the exchange conduit dividing into two bifurcated portions,
  (b) the vent valve means being cross over relief valves fitted in the bifurcated portions/of the exchange conduit means to balance approximately pressure differences between the pumping and expansion chambers.

6. Apparatus as claimed in caim 2, 3, 4 or 5 further characterized by:
  (a) exchange conduit means communicating with the return and outfeed conduit means and positioned between the chambers of the feed cylinder and the first and second valve means associated with the return and outfeed conduit means.

7. Apparatus as claimed in claim 1 further characterized by:
  (a) at least two additional feed cylinders, each cylinder having a feed displacer and a feed displacer rod, the rods being driven by the rotatable drive means so that the cylinders are phased apart from each other, each additional cylinder communicating with the conduit means to pump fluid to, and to receive fluid from, the membrane means,
  (b) the first valve means of each feed cylinder cooperating with the rotatable drive means associated with one of the additional cylinders to provide phase difference for valve actuation.

8. Pumping apparatus as claimed in claim 1 further characterized by:
  (a) a plurality of similar feed cylinders wherein the total number of feed cylinders in a cooperating set is factored by an odd number greater than one, the feed cylinders having respective reciprocable feed displacers and respective feed displacer rods, each displacer rod cooperating with the rotatable drive means so that the feed displacers are phased angularly equally apart, inlet and outfeed conduit means and respective second valve means communicating with the respective pumping chambers to admit feed fluid into and to conduct feed fluid from the pumping chambers to the membrane means, return conduit means to conduct concentrate fluid from the membrane means to respective expansion chambers of each cylinder, the first valve means of each cylinder is responsive to the drive means of a remaining cylinder so that the first valve means controlling fluid flow relative to a particular cylinder is phased relative to that particular cylinder by an amount dependent on phase angle between cylinders of the cooperating set.

9. A pumping apparatus as claimed in claim 8 further characterized by:
  (a) the first valve means of each feed cylinder is actuated by a feed displacer rod means of another cylinder separated by a phase angle which differs from 90° by half of the dwell angle.

10. A pumping apparatus as claimed in claim 7, 8 or 9 further characterized by:
  (a) the first valve means of each feed cylinder being a slidable valve spool connected with the respective feed displacer rod so that the valve spool connected to the displacer rod of one cylinder controls the direction of pressurized concentrate fluid flow from the membrane means to the expansion chamber of one of the remaining feed cylinders.

11. A pumping apparatus as defined in claim 7, 8 or 9 further characterized by:
  (a) the first, second and third feed cylinders having respective first, second and third valve spools and valve chambers, each spool being reciprocable within the respective valve chamber and rigidly connected to the respective feed displacer rod,
  (b) each valve chamber having at one end thereof interconnected concentrate fluid return conduit means, at an opposite end thereof interconnected exhaust fluid conduit means, and adjacent an intermediate position between ends of the chamber an intermediate concentrate fluid conduit means interconnecting the valve chamber of one cylinder with an expansion chamber of one of the remaining cylinders.

12. A method of membrane separation of a feed fluid into permeate fluid and concentrate fluid fractions which are respectively permeated and rejected by selective membrane means, the membrane means being exposed to pressurized feed fluid supplied by a reciprocating feed pump means having at least one feed cylinder with a feed displacer mounted on a feed displacer rod, the rod being driven by reciprocable drive means, the displacer dividing the cylinder into a pumping chamber for feed fluid and an expansion chamber for concentrate fluid, valve means determining fluid flow directions to and from the chambers and the membrane means, the method including steps of: simultaneously inducting feed fluid into the pumping chamber and exhausting depressurized concentrate fluid from the expansion chamber; followed by: pressurizing feed fluid in the pumping chamber and simultaneously admitting pressurized concentrate fluid into the expansion chamber to supplement energy supplied to the feed displacer, the method being characterized by:
  (a) following reversal of feed displacer rod movement, exchanging fluid volume between the pumping and expansion chambers externally of the feed cylinder interior so as to approximately equalize pressure difference across ports of a directional valve means that are about to be opened prior to opening of such ports, and essentially simultaneously shifting the first valve means across an effectively closed intermediate position thereof.

13. A method as claimed in claim 12 further characterized by:
(a) exchanging fluid volume between the pumping and expansion chambers by deflecting a pressure responsive partition which separates fluids in the pumping and expansion chambers to prevent intermixing thereof.

14. A method as claimed in claim 12 further characterized by:
(a) exchanging fluid volume between the pumping and expansion chambers by permitting intermixing externally of the chambers between portions of the fluid in the chambers.

15. A method as claimed in claim 12 further characterized by:
(a) simultaneously whilst operating one feed cylinder, also operating from the rotatable drive means at least two additional feed cylinders so that the feed cylinders are phased equally apart from each other,
(b) operating the valve means associated with each feed cylinder by the rotatable drive means associated with one of the additional cylinders, phase difference between the cylinders providing adequate dwell for valve actuation.

* * * * *